United States Patent [19]

Cassidy et al.

[11] Patent Number: 5,537,684
[45] Date of Patent: Jul. 16, 1996

[54] METHOD FOR A COMMUNICATION UNIT TO INFLUENCE COMMUNICATION RESOURCE ALLOCATION

[75] Inventors: Lizabeth A. Cassidy, Fox River Grove; Daniel J. McDonald, Cary, both of Ill.

[73] Assignee: Motorola, Inc., Schaumburg, Ill.

[21] Appl. No.: 282,337

[22] Filed: Jul. 29, 1994

[51] Int. Cl.⁶ .................................................. H04B 1/00
[52] U.S. Cl. .......................... 455/34.1; 455/54.2; 455/58.2
[58] Field of Search .................................. 455/33.1, 34.1, 455/34.2, 38.4, 38.1, 58.2, 158.5; 379/59, 89; 340/825.44; 345/119, 146

[56] References Cited

U.S. PATENT DOCUMENTS

| | | | |
|---|---|---|---|
| 4,573,207 | 2/1986 | Smith et al. | 455/58.2 |
| 4,905,302 | 2/1990 | Childress et al. | 455/34.1 |
| 4,961,070 | 10/1990 | Maher et al. | 345/119 |
| 5,081,669 | 1/1992 | Slaninka et al. | 379/56 |
| 5,177,780 | 1/1993 | Kasper et al. | 379/59 |
| 5,283,818 | 2/1994 | Klausner et al. | 379/89 |
| 5,379,030 | 1/1995 | Nolan et al. | 340/825.44 |
| 5,420,574 | 5/1995 | Erickson et al. | 379/63 |

*Primary Examiner*—Andrew Faile
*Attorney, Agent, or Firm*—Susan L. Lukasik

[57] ABSTRACT

A communication unit (105) may influence communication resource allocation within a communication system in the following manner. A list of pending communication requests intended for the communication unit (105) is shown on a display of the communication unit (105). An order in which the pending communication requests are to be processed is selected and transmitted by the communication unit (105) to the infrastructure (101, 102, 103, and 107) of the communication system. The infrastructure then processes the pending communication requests for the communication unit (105) based on the order selected by the communication unit (105).

33 Claims, 9 Drawing Sheets

| BUSY CALL # | CALL TYPE | COMMUNICATION UNITS INVOLVED | CALCULATED PRIORITY | USER-SELECTED PRIORITY |
|---|---|---|---|---|
| 1 | EMERGENCY | TALK GROUP 1 | 1 | |
| 2 | GROUP CALL | TALK GROUP 2 | 2 | |
| 3 | PRIVATE CALL | COMM. UNIT 1 ⟶ COMM. UNIT 2 | 5 | 3 |
| 4 | PRIVATE CALL | COMM. UNIT 3 ⟶ COMM. UNIT 4 | 5 | |
| 5 | INTERCONNECT | 555-6789 ⟶ COMM. UNIT 2 | 5 | 1 |
| 6 | GROUP CALL | TALK GROUP 3 | 5 | X |
| 7 | PRIVATE CALL | COMM. UNIT 6 ⟶ COMM. UNIT 2 | 5 | 2 |
| 8 | PRIVATE CALL | COMM. UNIT 5 ⟶ COMM. UNIT 2 | 5 | * |

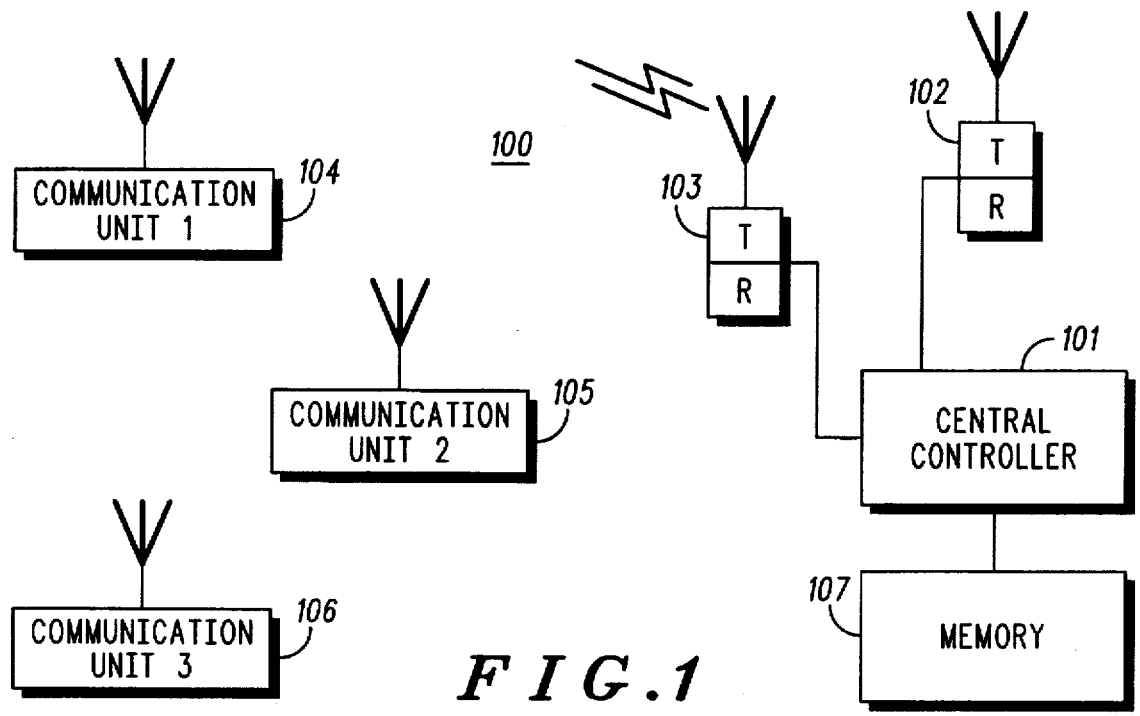
FIG.1
FIG.2
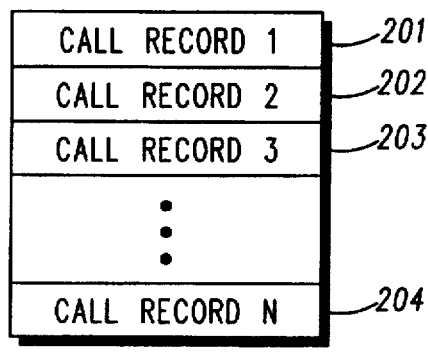
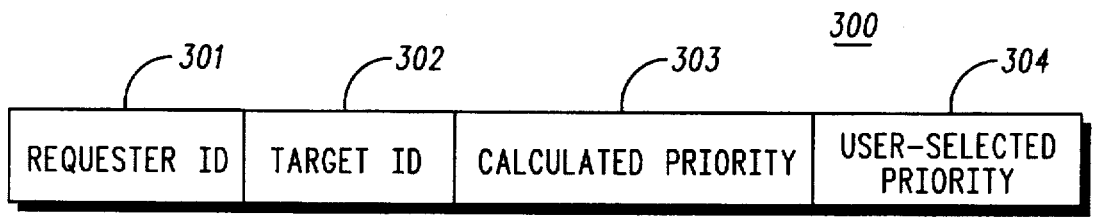
FIG.3

| BUSY CALL # | CALL TYPE | COMMUNICATION UNITS INVOLVED | CALCULATED PRIORITY | USER-SELECTED PRIORITY |
|---|---|---|---|---|
| 1 | EMERGENCY | TALK GROUP 1 | 1 | |
| 2 | GROUP CALL | TALK GROUP 2 | 2 | |
| 3 | PRIVATE CALL | COMM. UNIT 1 → COMM. UNIT 2 | 5 | 3 |
| 4 | PRIVATE CALL | COMM. UNIT 3 → COMM. UNIT 4 | 5 | |
| 5 | INTERCONNECT | 555-6789 → COMM. UNIT 2 | 5 | 1 |
| 6 | GROUP CALL | TALK GROUP 3 | 5 | X |
| 7 | PRIVATE CALL | COMM. UNIT 6 → COMM. UNIT 2 | 5 | 2 |
| 8 | PRIVATE CALL | COMM. UNIT 5 → COMM. UNIT 2 | 5 | * |

FIG. 4

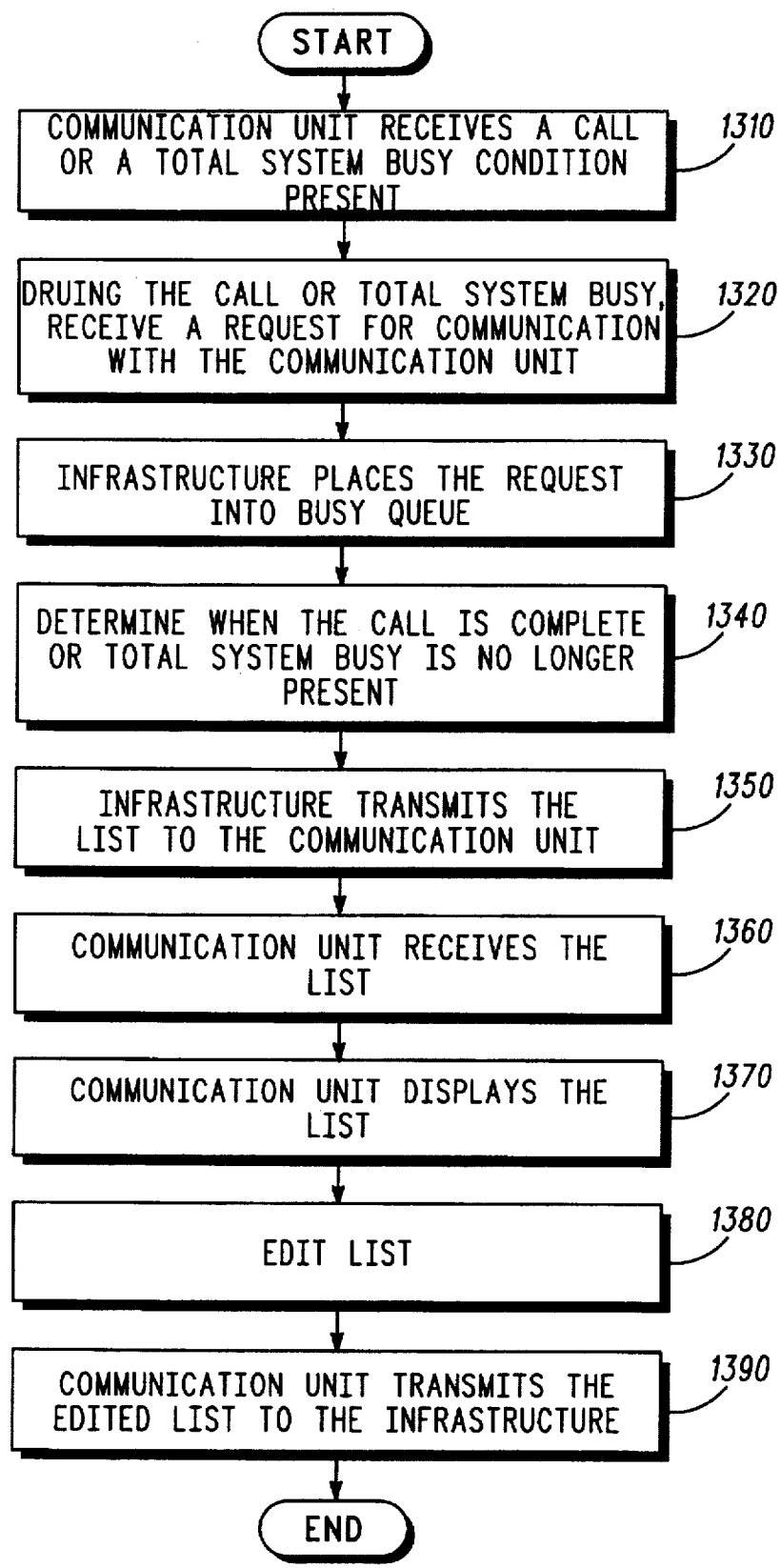

1

METHOD FOR A COMMUNICATION UNIT TO INFLUENCE COMMUNICATION RESOURCE ALLOCATION

FIELD OF THE INVENTION

The present invention relates generally to communication systems and, including but not limited to modification of a busy queue within the communication system.

BACKGROUND OF THE INVENTION

Communication units of a trunked communication system typically participate in various types of calls, such as, private calls, group calls, and interconnect calls. When a communication unit is active in a call or the communication unit is not in operation, it is possible that a request for a call may occur such that the communication unit is not available for the request. This call is placed in a busy queue, as a pending communication request, by an infrastructure, or fixed end, of the communication system. In addition, a request for a call to a particular communication unit may not be granted due to a lack of necessary communication resources, as when a total system busy condition occurs. This request is also placed in the busy queue by the infrastructure as a pending communication request.

In present communication systems, when necessary communication resources and a target communication unit are both available, a pending communication request for the target communication unit is converted into an active communication based on a priority level and time of receipt of the pending communication request. While this method worked for prior art communication systems, it does not allow conversion of pending communication requests into active communications based on criteria other than priority level and receipt time.

Therefore, a need exists for a method of converting pending communication requests such that the conversion is not based solely on priority level and receipt time.

BRIEF DESCRIPTION OF THE DRAWINGS

FIG. 1 illustrates a trunked communication system in accordance with the present invention.

FIG. 2 illustrates pending communication requests in a busy queue in accordance with the present invention.

FIG. 3 illustrates a format of call records in a busy queue in accordance with the present invention.

FIG. 4 illustrates a busy queue in accordance with the present invention.

FIG. 13 illustrates a flowchart of a method of providing user editable busy lists within a communication system in accordance with the present invention.

DESCRIPTION OF A PREFERRED EMBODIMENT

Figure 5:
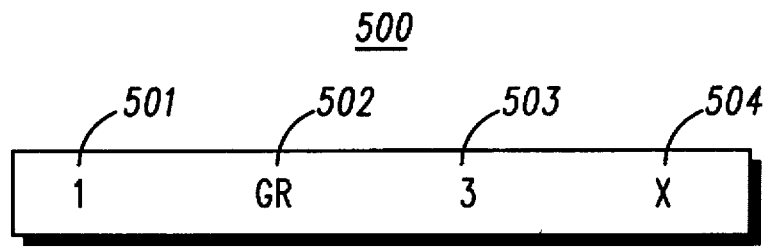
FIG. 5 through FIG. 9 illustrate pending communication requests in accordance with the present invention.

The following describes in detail a method for manipulating a busy queue in a trunked communication system in a manner that overcomes trunked system disadvantages known in the art. Generally, the present invention provides a method for a user of the communication system to impact the assignment of communication resources. The present invention provides the user the ability to view any pending requests targeted for this user and to prioritize these pending requests. The prioritized pending requests can then be transmitted to a central resource controller, which uses this information when granting pending requests. Pending requests are then granted on a priority basis where the priority information is based on a system calculated priority and the user's selected priority for the affected pending requests. This invention allows the user of a communication system to provide an element of control of how resources should be allocated for this user, based on a user perceived importance.

FIG. 1 illustrates a trunked communication system (100) in accordance with the present invention. The trunked communication system (100) includes communication units (104–106) and an infrastructure, also known as a fixed end, comprising a central resource controller (101) with memory (107) and repeaters (102 and 103) having associated communication resources. The central resource controller (101) is responsible for dynamically allocating the communication resources associated with the repeaters (102 and 103) to the communication units (104–106) when needed to complete a communication. The trunked system (100), as shown, supports two communication resources. The communication units (104–106), may be portable radios, or mobile radios, such as, an MT 2000 trunked radio available from Motorola, Inc. Although only three communication units (104–106) are shown in FIG. 1, the invention will be successfully applied to any number of communication units. The central resource controller (101), such as a Central Controller available from Motorola, Inc., also utilizes memory (107) to manage communication requests that have been pended due to an inability to allocate communication resources necessary to complete the communication request. These pending communication requests are managed by the central resource controller (101) via a busy queue. The busy queue contains all pending communication requests for all communication units (104–106) in the communication system. Information from the infrastructure is transmitted by one or more of the repeaters (102 and 103), such as an MSF5000 Repeater available from Motorola, Inc.

FIG. 2 illustrates one method in which pending communication requests (i.e., busied requests) are placed in the busy queue until the necessary communication resource(s) (or communication unit) become(s) available to convert the pending communication request into an active communication. The busy queue (200) contains a list of call records (201–204), i.e., pending communication requests, that are inserted into the busy queue (200). The busy queue (200) may be created using a standard linked list, which is well known in the art, thus no further discussion will be presented. The call records (201–204) that compose the busy queue (200) are inserted on a sorted basis. In the preferred embodiment, the call records (201–204) are sorted within the busy queue (200) based on a calculated priority value. The calculated priority is a numerical value used to determine the position of the pending request's call record in the busy queue (200). A calculated priority level is determined based on a system priority level of affected communication units and an affected communication group, type of call request (either dispatch or telephone interconnect) and whether the communication units are recent users of the system.

Each call record in the busy queue (200) has a format as illustrated in FIG. 3. The call record (300) is comprised of a requester ID (301), a target ID (302), the calculated priority (303) and a user selected priority (304). In the preferred embodiment, the requester ID (301) is a numerical representation of the communication unit (105) that initiated the pending communication request. The target ID (302) is a numerical representation of the communication unit (105) or communication group that is the target of the pending communication request. The user selected priority (304) is the priority ranking of the pending communication requests transmitted by the target communication unit (105). The user selected priority is used by the central resource controller (101) when attempting to allocate resources to convert pending communication requests into an active communication for the target communication unit (105).

A table illustrating examples of pending communication requests in the busy queue is shown in FIG. 4. FIG. 4 illustrates a particular busy queue. Pending request or busy call number 1 in the busy queue is an emergency call having calculated priority level 1. An emergency call, like a group call, is a high priority call. Emergency calls are positioned in the busy queue amongst all other pending emergency calls at the top of the busy queue, according to the time the emergency was received. After emergency calls, group calls and individual calls are positioned in the busy queue based on calculated priority, as previously described in the section regarding FIG. 2.

Busy call number 2 is a group call having a calculated priority level 2. Busy call numbers 3 through 8 are all various types of calls, each having the same calculated priority. Busy call numbers 3, 5, 7, and 8 are all targeted for communication unit 2 (105). In busy call number 6, communication unit 2 (105) is a member of talkgroup 3, thus busy call number 6 is also targeted for communication unit 2 (105) as well as other communication units that are a member of talkgroup 3. Busy call number 4, a private call, is not targeted to communication unit 2 (105).

The present invention allows an operator of communication unit 2 (105) to assign a preferential user selected priority to those individual calls all of the same priority that are targeted for communication unit 2 (105). In the preferred embodiment of the present invention, group calls cannot be modified by the communication unit operator, i.e., the communication unit operator can not assign a user selected priority to a group call even though they are targeted to the user's communication unit (105). This is depicted by an "X" in the user-selected priority column for call number 6. The unit operator can rank the individual calls according to personal importance which influences the order in which a conversion from pending request to active communication occurs for these calls. This is depicted by the numerical ranking in the user-selected priority column of call numbers 3, 5, and 7 of the table. The communication unit operator can also delete a pending communication request targeted to the communication unit (105). This is depicted by an asterisk (*) in the user-selected priority column for call number 8. In the preferred embodiment of the present invention, a user chooses user selected priorities only when the communication unit (105) is not presently involved in a communication or call.

In one embodiment of the present invention, communication unit 2 (105) is alerted of pending communication requests in the busy queue via an audible tone and a visual display of pending communication requests targeted to the communication unit. The collection of pending communication requests is referred to as a target busy list or a busy list, as will be referred to later in the text. In another embodiment, the communication unit (105) transmits an inbound signal word requesting the busy list. In either case, each pending communication request targeted for communication unit 2 (105) is shown on communication unit 2's (105) display sequentially, as the pending communication requests are physically located in the busy queue. A detailed description of the above follows in FIG. 5 through FIG. 9.

FIG. 5 through FIG. 9 depict communication unit displays of pending communication requests. Pending requests from the busy queue that are intended for a particular communication unit are transmitted to that communication unit in the form of a busy list, so the unit operator has the opportunity to edit this busy list. FIG. 5 illustrates a display for a talkgroup call for which communication unit 2 is indirectly a target (500), i.e., communication unit 2 (105) is a member of the talkgroup. Although communication unit 2 (105) cannot modify the priority of talkgroup calls, talkgroup calls are displayed and precede all individual calls for which communication unit 2 (105) is a target. The first field (501) denotes that it is the first pending communication request in the busy queue targeted to communication unit 2 (105). The second field (502) denotes that this is a talkgroup call. The third field (503) denotes the talkgroup number, Talkgroup 3, for which the unit operator is a member of. The fourth field (504) denotes, with an X, that the priority of this particular pending communication request can not be modified by the communication unit (105) operator.

Figure 6:
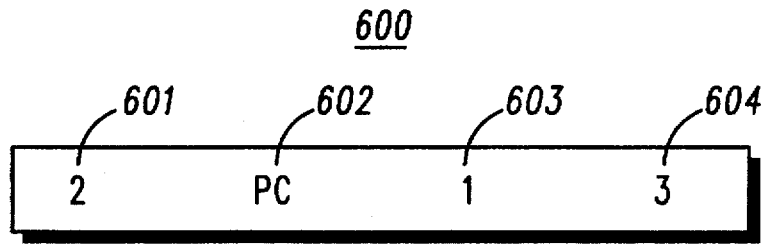

FIG. 6 illustrates the display for a private call for which communication unit 2 is a target (600). The first field (601) denotes that this is the second pending communication request in the busy queue targeted to communication unit 2. The second field (602) denotes that this is a private call. The third field (603) denotes the ID of the communication unit that has called the target unit. The fourth field (604) indicates that the communication unit (105) has selected this pending communication request to be ranked third amongst all other individual pending communication requests targeted for communication unit 2 (105).

Figure 7:
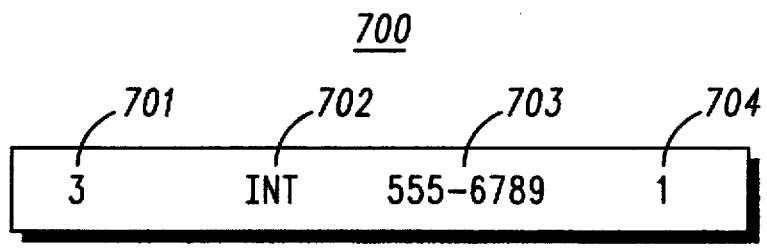

FIG. 7 illustrates the display for an interconnect (telephone) call for which communication unit 2 (105) is a target (700). The first field (701) denotes that this is the third pending communication request in the busy queue targeted to communication unit 2 (105). The second field (702) denotes that this is an interconnect call. The third field (703) denotes the phone number of the calling party for the interconnect call. The fourth field (704) denotes that the communication unit 2 (105) has selected this pending communication request to be ranked first amongst all other individual pending communication requests targeted for communication unit 2 (105).

Figure 8:
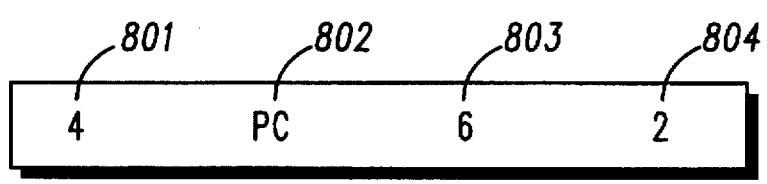

FIG. 8 illustrates the display for a private call for which communication unit 2 (105) is a target (800). The first field (801) denotes that this is the fourth pending communication request in the busy queue targeted to communication unit 2 (105). The second field (802) denotes that this is a private call. The third field (803) denotes the ID of communication unit that has called the target unit (105). The fourth field (804) denotes that communication unit 2 (105) has selected this pending communication request to be ranked second amongst all other individual pending communication requests targeted to communication unit 2 (105).

Figure 9:
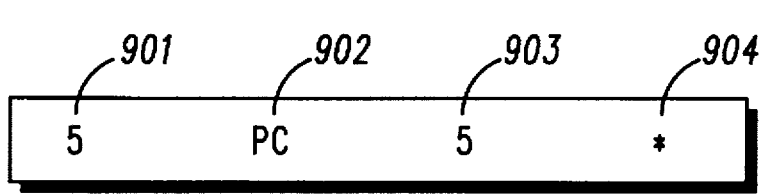

FIG. 9 illustrates the display for a private call for which communication unit 2 (105) is a target (900). The first field (901) denotes that this is the fifth pending communication request in the busy queue targeted to communication unit 2 (105). The second field (902) denotes that this is a private call. The third field (903) denotes the ID of communication unit that has called the target unit. The fourth field (904) denotes that communication unit 2 (105) has selected this pending communication request to be deleted from the busy list as indicated by an asterisk (*).

In the descriptions of FIG. 10 through FIG. 16, inclusive, the word "list" is used instead of the phrase "busy list" for the sake of simplicity.

Figure 10:
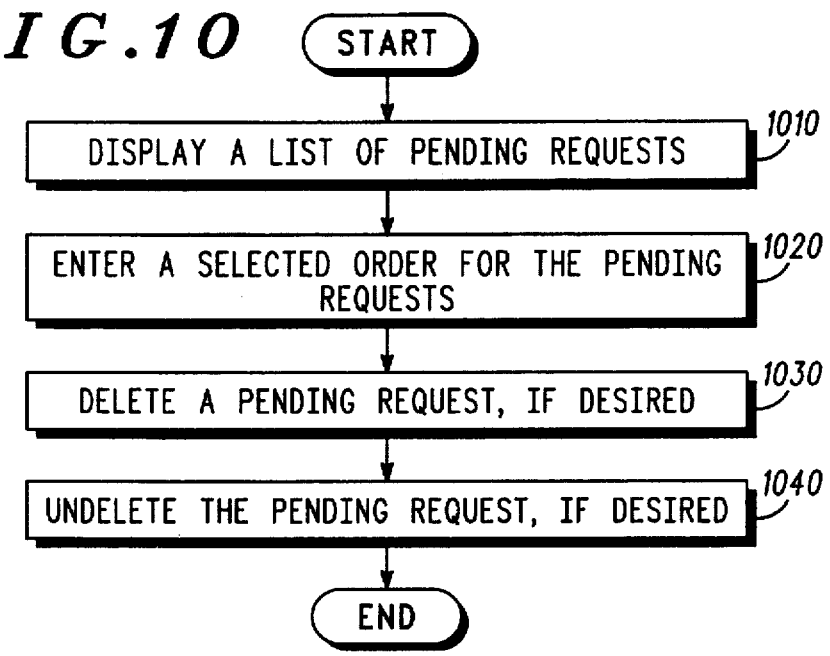
FIG. 10 illustrates a flowchart of modifying a busy list of pending communication requests by a communication unit in accordance with the present invention.

The flowchart of FIG. 10 shows a method for a communication unit (105) to influence communication resource allocation in a communication system wherein a plurality of communication resources is dynamically, temporarily allocated to at least one communication unit (105). At step 1010, the list of pending communication requests targeted for the communication unit (105) is displayed on the communication unit's display. This list is transmitted from the central resource controller to the communication unit (105). An order in which the pending communication requests are to be processed is selected, and this selected order for the pending requests is entered into the communication unit for subsequent transmission at step 1020. This selected order is the order in which the communication unit (105) operator prefers the pending communication requests targeted for the communication unit (105) to be converted into active communications. In addition, the communication unit (105) operator may select to delete a pending communication request from the list at step 1030. In this manner, the communication unit (105) operator shows a preference not to have the deleted pending request converted into an active communication targeted for the communication unit (105). At step 1040, if desired, the communication unit (105) operator may also select to undelete a pending communication request that was deleted from the list in step 1030. In this instance, the undeleted pending communication request is returned to the list to be converted into an active communication at the proper time.

Figure 11:
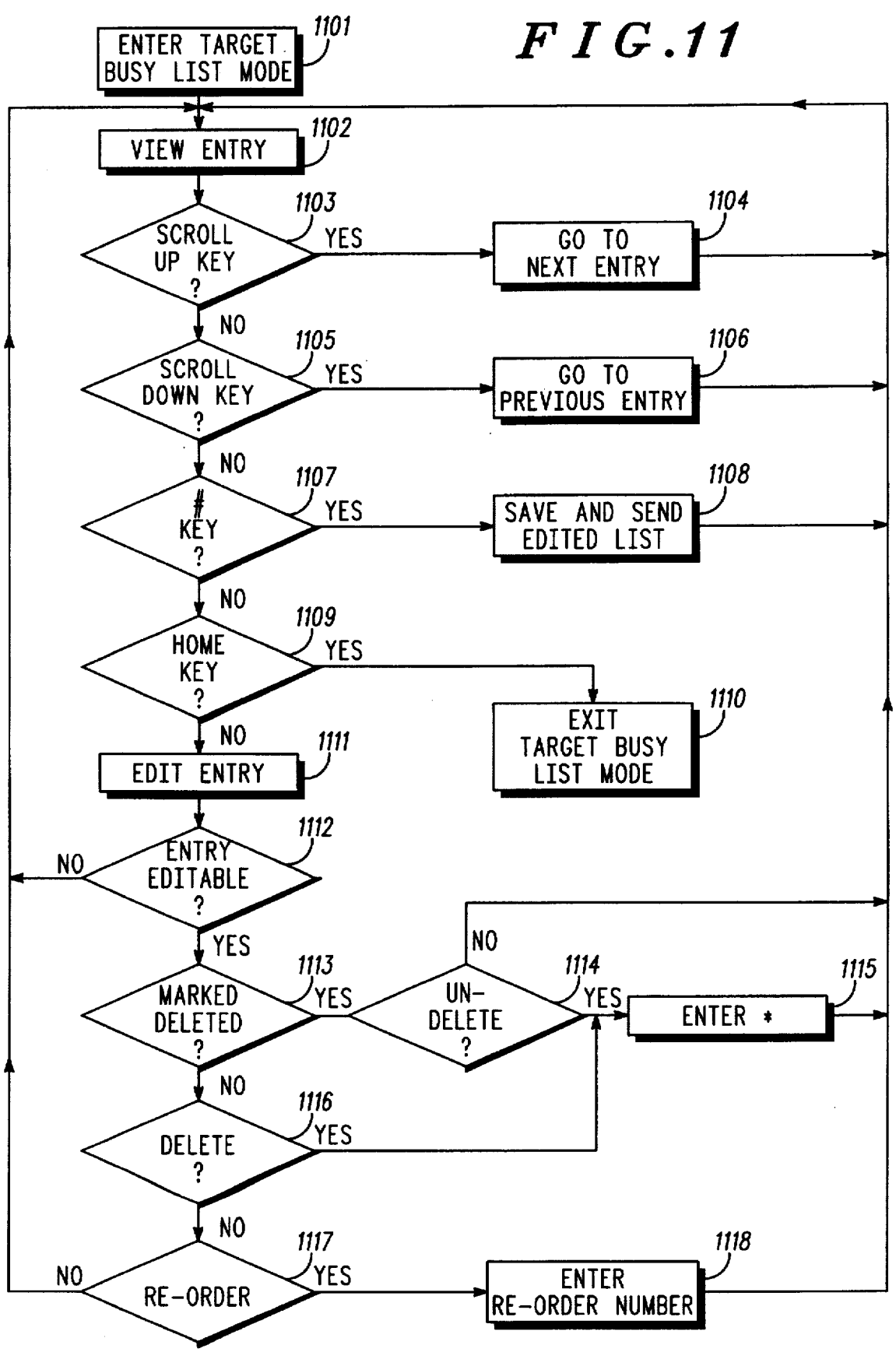
FIG. 11 illustrates a flowchart of editing a busy list by a communication unit in accordance with the present invention.

FIG. 11 is a flowchart of operations that occur at a communication unit (105) during a busy queue editing process. At step 1101, where the communication unit enters into a target busy list mode. There are several ways in which the communication unit (105) may enter into this mode of operation. As previously mentioned, in one embodiment, the communication unit (105) is alerted of pending communication requests in the busy queue via a data message from the infrastructure. The infrastructure then transmits the list to the target communication unit (105). After receiving the list, the communication unit (105) creates a visual display of the list. In an alternative embodiment, the communication unit transmits an inbound signal word to the infrastructure requesting the list. Again, after receiving the list, the communication unit (105) creates a visual display of the list. In either case, each pending communication request targeted for the communication unit (105) is shown on the communication unit's display. The process continues with a view entry state of the target busy list mode of operation at step 1102, where the first entry in the list is displayed. This is followed by a series of tests for particular viewing control key presses.

At step 1103, a test for detection of a "scroll up" key press is performed. In the preferred embodiment the right arrow key may be used to indicate "scroll up," but any key may be used. If the scroll up key is detected at step 1103, a subsequent entry from the list is displayed at step 1104. If the scroll up key is not detected at step 1103, a test for detection of a "scroll down" key press is performed at step 1105. In the preferred embodiment the left arrow key may be used to indicate "scroll down", but any key may be used. If the scroll down key is detected at step 1105, a previous entry from the list is displayed at step 1106.

If the scroll down key is not detected at step 1105, a test for detection of a "save and send" key press is performed at step 1107. In the preferred embodiment the pound (#) key may be used to indicate "save and send", but any key may be used. If the save and send key is detected at step 1107, the edited list is transmitted to the infrastructure at step 1108.

If the save and send key is not detected at step 1107, a test for detection of a "home" key press is performed at step 1109. In the preferred embodiment the "HOME" key may be used to indicate "home," but any key may be used. If the home key is detected at step 1109, the communication unit (105) exits the target busy list mode of operation at step 1110.

If the home key is not detected at step 1109, the communication unit (105) enters an edit entry state of the target busy list mode of operation at step 1111. This state begins with a determination as to whether the currently displayed entry is editable (1112). (If a group call is currently displayed, it is not editable.) If the entry is not editable at step 1112, the process continues at step 1102, the view entry state. If the entry is editable at step 1112, a test is performed to determine if the current entry is marked deleted at step 1113.

If the current entry is marked deleted at step 1113, a test is performed to determine if the communication unit (105) operator prefers to undelete the current entry at step 1114. If the communication unit operator does not prefer to undelete the current entry at step 1114, the process continues at step 1102, the view entry state. If the communication unit (105) operator does prefer to undelete the current entry at step 1114, the communication unit (105) operator depresses the asterisk (*) key at step 1115 in the preferred embodiment, but any key may be used to indicate that the previously deleted entry should be undeleted. The process then continues at step 1102, the view entry state.

If the current entry is not marked deleted at step 1113, a test is performed to determine if the communication unit (105) operator prefers to delete the current entry at step 1116. If the communication unit operator (105) does prefer to delete the current entry at step 1116, the communication unit (105) operator depresses the asterisk (*) key at step 1115 in the preferred embodiment, but any key may be used. Again, the process continues at step 1102, the view entry state.

If the communication unit (105) operator does not prefer to delete the current entry at step 1116, a test is performed to determine if the communication unit (105) operator desires to reorder the priority of the current entry at step 1117. If the communication unit (105) operator does prefer to reorder the priority of the current entry at step 1117, the communication unit (105) operator enters in a numerical selection from the communication unit's keypad at step 1118 indicating a user selected priority rank of the current entry preferred. After entry of the user selected priority rank, the process continues at step 1102. If the communication unit (105) operator does not prefer to reorder the priority of the current entry at step 1117, the process continues at step 1102, the view entry state.

Figure 12:
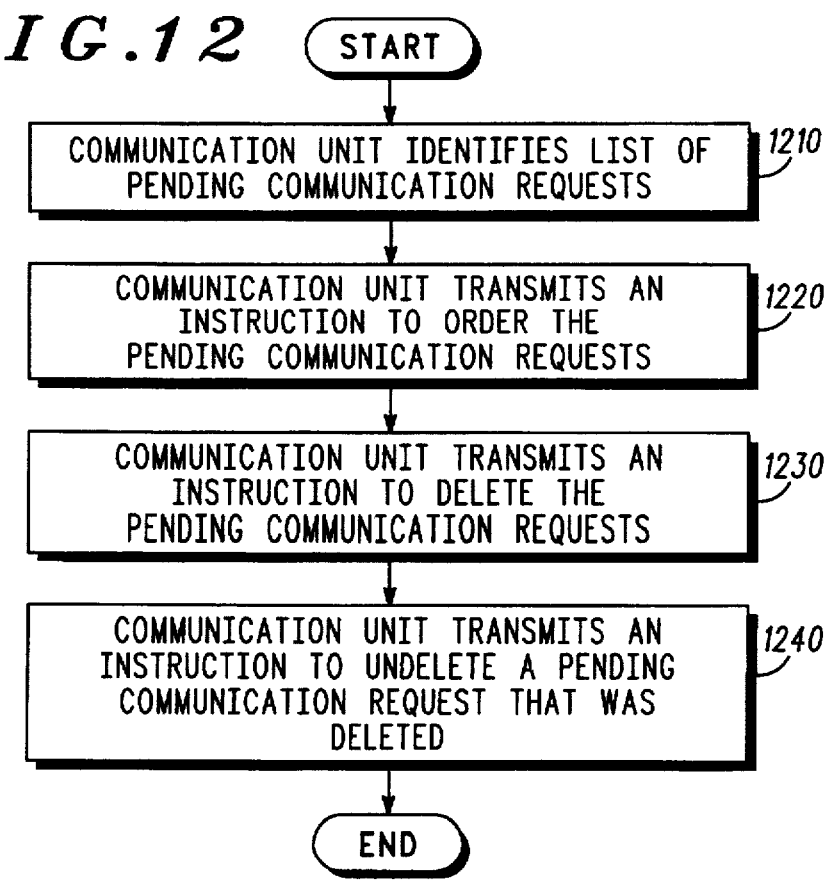
FIG. 12 illustrates a flowchart of modifying a busy list of pending communication requests by a communication unit in accordance with the present invention.

The flowchart of FIG. 12 shows an alternative method for a communication unit (105) to influence communication resource allocation in a communication system wherein a plurality of communication resources is dynamically, temporarily allocated to at least one communication unit (105). At step 1210, the communication unit (105) identifies pending communication requests in a list. The communication unit (105) transmits instructions to order the pending communication requests in a particular order at step 1220. In addition, at step 1230, the communication unit (105) transmits an instruction to delete a pending communication request from the list. If desired, at step 1240, the communication unit (105) may transmit an instruction to undelete the pending communication request that was deleted in step 1230, and the process ends.

A flowchart showing the steps performed in a system for providing user editable busy lists is shown in FIG. 13. This flowchart covers two different situations: 1) when the communication unit (105) is not available to receive a call, either because the communication unit (105) is currently involved in a call or the communication unit (105) is not in operation; and 2) when a total system busy condition is present, i.e., when all communication resources within the system are allocated at a particular time or when insufficient communication resources are available to handle a pending call(s).

At step 1310, a call is received by a communication unit (105), or a total system busy condition is present. During the call, during a time when the communication unit (105) is not operating, or during a total system busy condition, at least one request for communication with the communication unit (105) is received at step 1320. At step 1330, the infrastructure places the at least one request in the busy queue. At step 1340, the infrastructure determines if the call of step 1310 is completed, the communication unit (105) becomes operative when it was previously inoperative, or if a total system busy condition is no longer present. This determination may be made by 1) receiving, from the communication unit (105), a request for a list of pending communication requests when the call is completed; 2) receiving a notification that the communication unit (105) becomes operative; or 3) sufficient communication resources becoming available for allocation. In addition, when the call is complete, the infrastructure may automatically generate a data message that is transmitted to the communication unit (105). Upon receipt of this data message, the communication unit (105) generates an indication, such as an audible tone, so as to notify the user of the communication unit that it has a pending communication request. The infrastructure transmits the list to the communication unit (105) at step 1350. Therefore, the infrastructure automatically transmits the list or the communication unit (105) may request transmission of the list. The list is comprised of pending communications for the particular communication unit (105) and is constructed from information in the busy queue. In one embodiment, the busy queue may include calls directed to the communication unit (105), another communication unit (104), or both communication units (104 and 105). When the busy queue also includes calls to the second communication unit (104), the infrastructure transmits part of the list, where the part includes calls directed to the targeted communication unit (105). The communication unit (105) receives the list at step 1360, and displays the list for the user of the communication unit (105) at step 1370.

At step 1380, the list is edited. In the preferred embodiment of the present invention, when the list includes both individual calls and group calls directed to the communication unit (105), editing of individual calls associated with the first communication unit (105) is allowed, while editing of group calls is prohibited. In a preferred embodiment, editing includes selecting a priority for each of the pending requests for communications in the list. When editing includes selecting a priority for each of the pending requests for communications in the list, the infrastructure handles the pending requests for communications in the edited list in an order according to the selected priority. In an alternative embodiment, editing may additionally include deleting one or more of the pending requests for communications from the list. When editing includes deleting one or more of the pending requests for communications from the list, editing may also include undeleting a deleted request for communications from the list, thereby returning the request for communications to the list. The communication unit (105) then transmits the edited list to the infrastructure at 1390. In addition, the infrastructure may automatically transmit the list to the first communication unit when a subsequent request for communications with the communication unit (105) is placed in the busy queue and two or more pending requests are present for a particular communication unit (105). In this manner, the communication unit (105) is informed of the placement of new requests in the busy queue.

Figure 14:
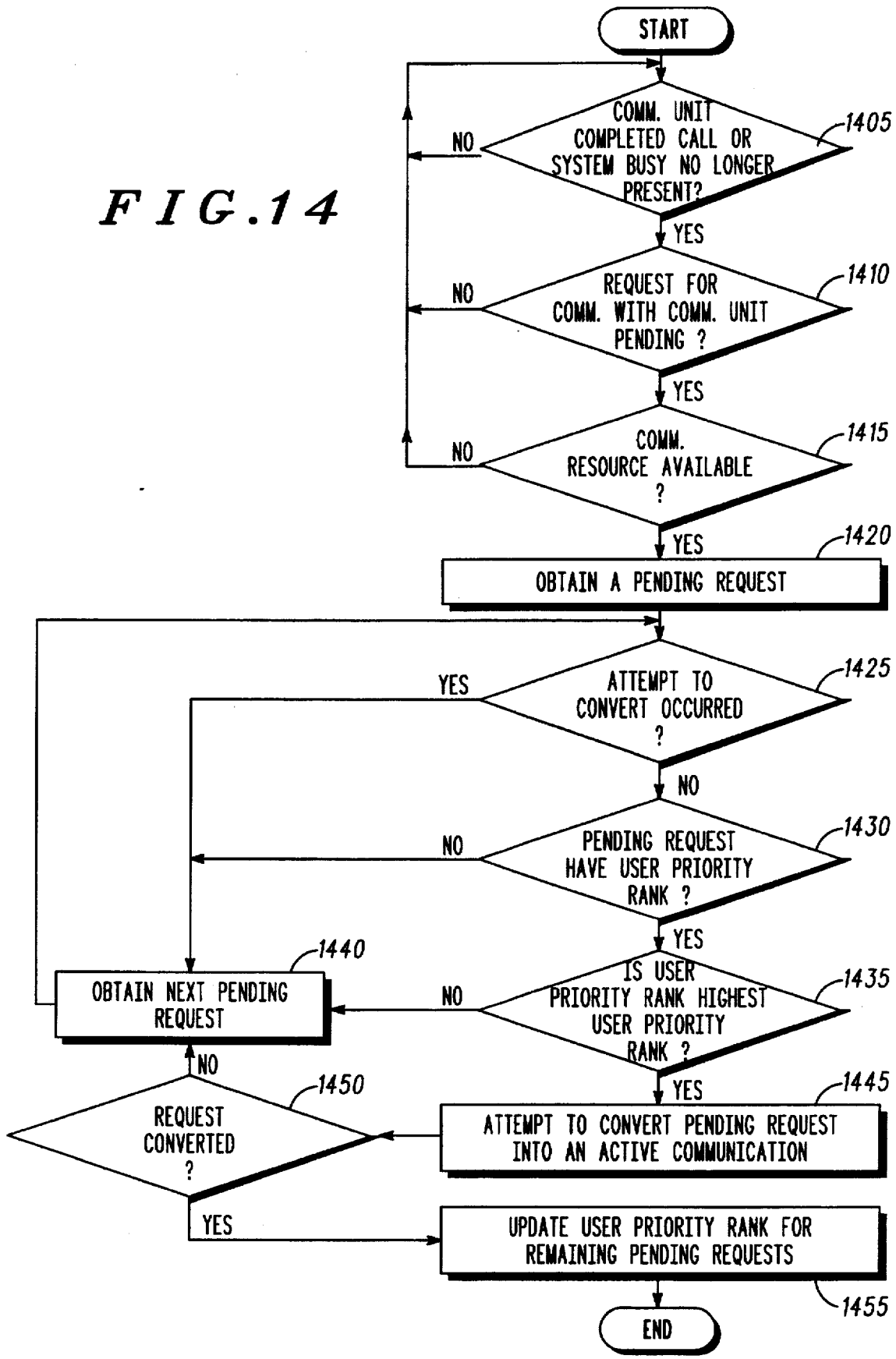
FIG. 14 illustrates a flowchart showing processing communication requests within a communication system in accordance with the present invention.

A flowchart showing a method of processing communication requests within a communication system is shown in FIG. 14. At step 1405, it is determined whether a communication unit (105) has completed a call which it is engaged in or if total system busy condition is no longer present. The process remains at step 1405 until the call is completed. At step 1410, it is determined whether one or more requests for communication with the communication unit (105) are pending when the communication unit (105) has completed the call. If one or more requests for communication are not pending at step 1410, the process continues with step 1405. If one or more requests are pending at step 1410, the process continues with step 1415. At step 1415, it is determined whether a communication resource is available. If a communication resource is not available at step 1415, the process continues with step 1405. If a resource is available at step 1415, the process continues with step 1420. At step 1420, a pending request of the one or more requests for communication with the communication unit (105) is obtained. At step 1425, it is determined whether an attempt to convert the pending request into an active communication has occurred. Such an attempt would have occurred in step 1450 (described later in this paragraph)in a previous pass through this flowchart. If such an attempt has occurred the process continues with step 1440 where the next pending request is obtained. If no attempt to convert the pending request, or busy is present at step 1425, then the process continues at step 1430. At step 1430, it is established whether the pending request has a user priority rank. If there is no rank in step 1430, the process continues with step 1440. If there is a rank at step 1430, the process continues with step 1435. At step 1435, it is determined if the user priority rank of the pending request being processed is the highest priority user priority rank amongst the pending requests where there has been no attempt to convert into an active communication. If the user priority rank is not the highest priority in step 1435, the process continues with step 1440. If the user priority rank is the highest at step 1435 then the process continues at step 1445, where an attempt is made to convert the pending request into an active communication. If at step 1450 the request is not converted, the process continues with step 1440. If at step 1450 the request is converted, the process continues with step 1455, where the user priority rank for the remaining pending requests is updated, and the process ends.

Figure 15:
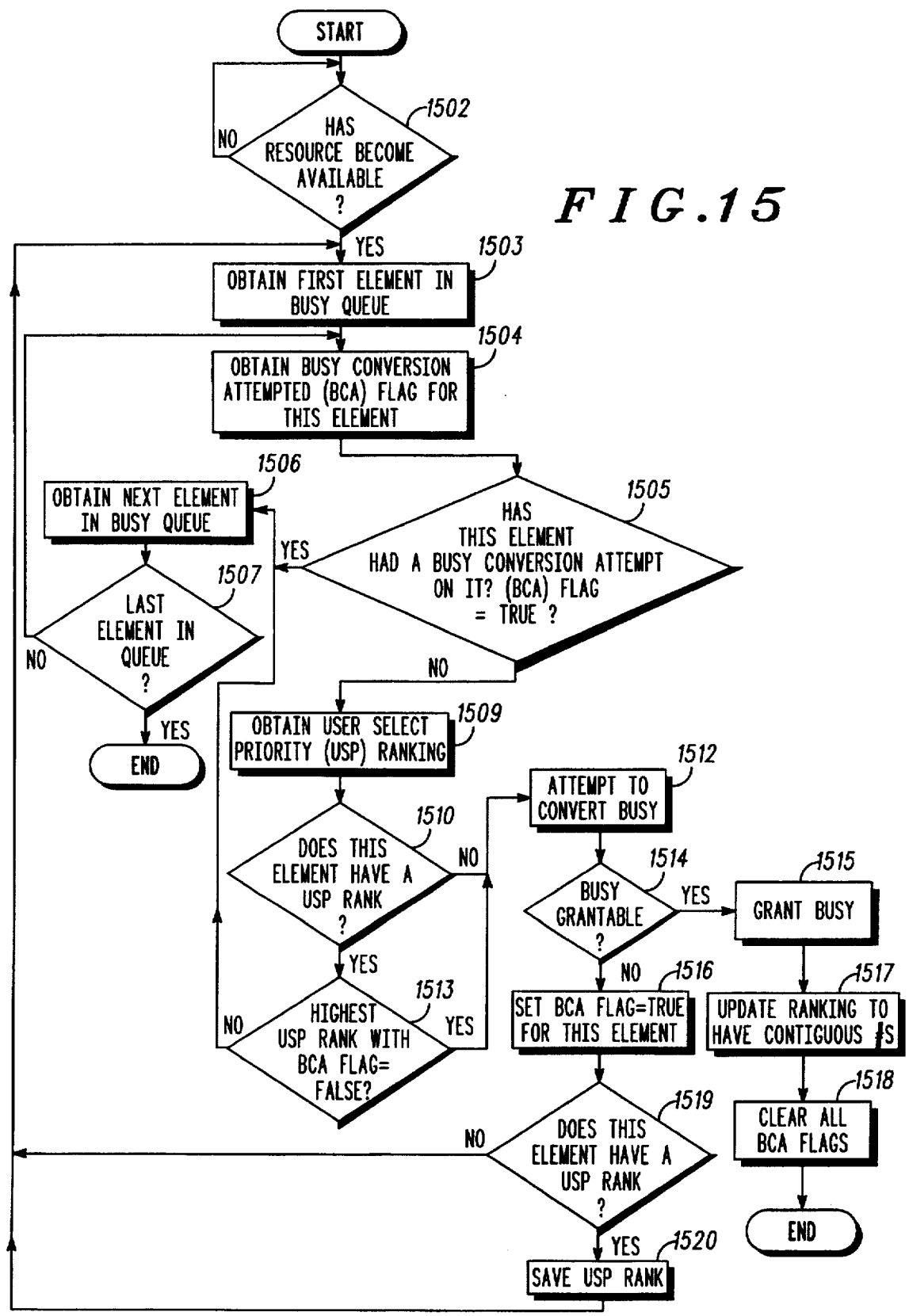
FIG. 15 illustrates a flowchart of operations that take place in an infrastructure when a communication resource becomes available and a pending request is examined in accordance with the present invention.

FIG. 15 is a flowchart of operations that take place at the infrastructure when a communication resource becomes available and a pending request (i.e., busied request) is examined. At step 1501, a determination is made as to whether a resource has become available for use by the central resource allocator. One example of when a resource can become available for use is when a communication ends and the resource(s) used for that communication are deallocated. If a resource becomes available at step 1502, processing continues with step 1503. If a resource has not become available at step 1502, processing continues at step 1502 until a resource becomes available.

Once a resource becomes available at step 1502, the first element (pending request) in the busy queue is obtained at step 1503. In one embodiment, this busy queue element is a call record, as previously described in FIG. 2 and FIG. 3. Associated with each busy queue element is a busy conversion attempt flag (BCA flag) that indicates whether this busy queue element has had a busy conversion attempt performed on it. A busy queue element is considered to have had a busy conversion attempt performed on it if the central resource allocator attempts to apply the available resource to the busy queue element. If the busy queue element could not utilize the available resource such that the busy queue element could be converted into an active communication, the busy conversion attempted flag for this busy queue element is set to true. At step 1504, the busy conversion attempted flag for the busy queue element is obtained.

At step 1505, it is determined whether the busy queue element has had a busy conversion attempt performed on it (i.e., BCA flag is true). If a busy conversion has been attempted on the busy queue element at step 1505, processing continues with step 1506 where the next busy queue element (pending request) in the busy queue is obtained. If there are no remaining busy queue elements in the busy queue at step 1507, the process ends. If there is at least one busy queue element remaining in the busy queue at step 1506, processing continues with step 1504 where the new busy queue element is analyzed.

At step 1505, if a busy conversion attempt has not been performed on the busy queue element, processing continues with step 1509 where a user selected priority (USP) rank is obtained from the busy queue element (i.e., call record). At step 1510, the user selected priority rank is analyzed and a determination is made as to whether or not this busy queue element has a user selected priority rank associated with it. If a user selected priority rank is not associated with the busy queue element at step 1510, processing continues with step 1512. If a user selected priority rank is associated with the busy queue element at step 1510 processing continues with step 1513 where a determination is made as to whether this busy queue element is the highest user selected priority ranked busy queue element for the target communication unit (105) that has not had a busy conversion attempted on it (i.e., BCA flag is false).

The determination of whether this is the highest USP ranked busy queue element is done by comparing the user selected priority rank of the busy queue element against the last saved USP value (initially, this value is set to the lowest user select priority) that had a busy conversion attempt performed on it for the target communication unit (105) (see step 1520). If this busy queue element is not the highest USP ranked element without a busy conversion attempt for the target communication unit (105) at step 1513, processing continues at step 1506 where the next busy queue element is obtained. If this busy queue element is the highest USP ranked element without a busy conversion attempt for the target communication unit (105) at step 1513, processing continues with step 1512.

At step 1512, an attempt is made to convert (grant) the busy queue element. This involves determining if the busy queue element can become an active communication based on the resource(s) that are now available on the communication system. At step 1514, If the busy queue element can be converted from pending to active, processing continues at step 1515 where the busy queue element is converted (granted) from a pending request into an active communication. At step 1517, if the busy queue element that was converted had a user selected priority rank, all remaining busy queue elements associated with the target communication unit (105) that have a user selected priority rank is updated. This is necessary so that the user selected priority information for this communication unit (105) (target communication unit) is ranked in a contiguous order (i.e., if USP 2 was granted leaving USPs 1 and 3, USP 3 is updated to USP 2). At step 1518, since a busy queue element has been converted, all busy conversion attempted flags are reset to false, and the process ends.

If the busy queue element can not be converted at step 1514, processing continues with step 1516 where the BCA flag for this busy queue element is set to true indicating that a busy conversion attempt has been performed on this busy queue element. At step 1519, a test is performed to determine if this busy queue element has a user selected priority rank associated with it. If this busy queue element does not have a user selected priority rank associated with it at step 1519, processing continues with step 1503. If there is a user selected priority rank associated with this busy queue element at step 1519, processing continues with step 1520 where the user selected priority rank for this target communication unit (105) is stored for later use (at step 1513). The processing then continues with step 1503.

Figure 16:
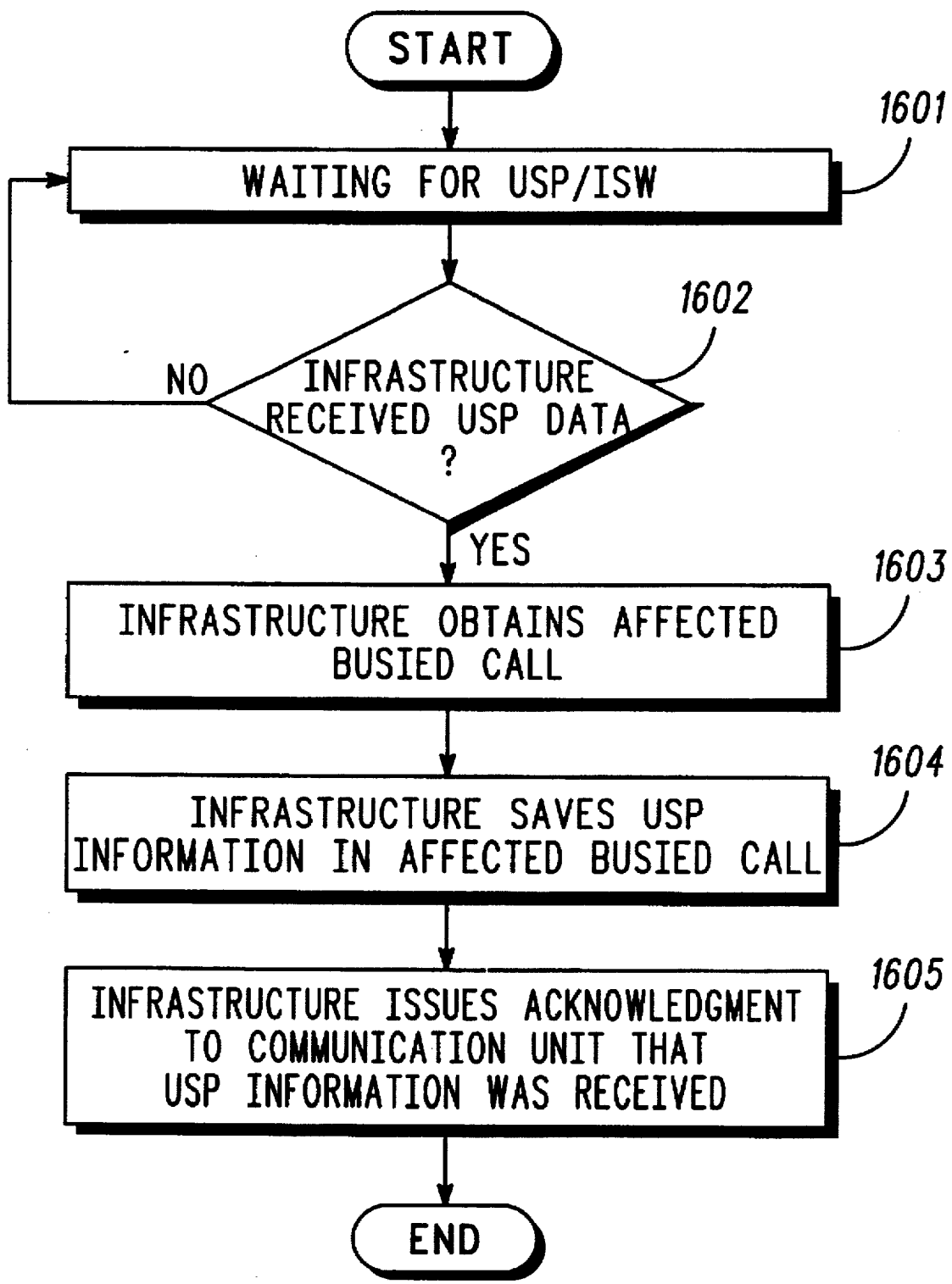
FIG. 16 illustrates a flowchart showing processing of user selected priority information in accordance with the present invention.

FIG. 16 generally depicts the process that occurs in the infrastructure when the infrastructure receives user selected priority information from a communication unit (105). At step 1601, the infrastructure waits for an Inbound Signaling Word (ISW) issued by the communication unit (105) that contains the user selected priority information. An ISW is generally known in the art as a mechanism used to send control information from the communication unit (105) to the infrastructure. In this instance, the ISW contains the communication unit's identification along with its user selected priority information. As an example, this information may be issued using a dual word ISW as used in a Motorola SmartNet trunked communication system.

At step 1602, if the infrastructure receives the ISW containing user selected priority information, processing continues with step 1603. If this information has not been received at step 1602, processing continues with step 1601. At step 1603, the infrastructure obtains all busy queue elements (call records) that are affected by the received user selected priority information. At step 1604, the infrastructure updates the call record with the received user selected priority information, i.e., the list. This update procedure is based on the received user selected priority information and includes entering the user selected priority information into the pending request's call record, deleting a pending request, or undeleting a pending request. At step 1605, the infrastructure issues an acknowledgment message to the communication unit (105) to indicate that the user selected priority information has been received and processed.

The present invention provides a method for a communication unit to influence communication resource allocation. The present invention provides the user of the communication unit with the ability to reorder its pending requests thereby producing a user selected priority. The infrastructure converts the pending requests into active communications based on the user selected priority, thereby converting a pending request of greater significance to the user of the communication unit into an active communication before converting a pending request of lower significance to the user. The user of the communication unit also has the flexibility of deleting a pending request, if desired, or undeleting a previously deleted pending request. By allowing the user of a communication unit to prioritize, delete, and undelete pending communication requests of a busy list for the particular communication unit, the user increases productivity and efficiency over a user of a prior art communication system.

What is claimed is:

1. In a communication system wherein a plurality of communication resources is dynamically, temporarily allocated to at least one communication unit, a method for a communication unit to influence communication resource allocation, the method comprising the steps of:

at the communication unit;

displaying a list of one or more pending communication requests for communication with the communication unit; and entering a selected order comprising a user priority rank for at least one of the one or more pending communication requests;

transmitting the selected order to the communication system;

at the communication system;

receiving the selected order;

when at least one communication resource is available for allocations, selecting a first pending request of the one or more pending communication requests;

establishing whether the first pending request has a user priority rank from the selected order;

determining, responsive to the establishing step, whether the user priority rank of the first pending request is a highest priority user priority rank; and when the user priority rank is the highest priority user priority rank, attempting to convert the first pending request into an active communication.

2. The method of claim 1, further comprising the step of deleting at least one of the pending communication requests from the list.

3. The method of claim 2, further comprising the step of undeleting the at least one of the pending communication requests that was deleted from the list, thereby returning the at least one of the pending communication requests to the list.

4. In a communication system wherein a plurality of communication resources is dynamically, temporarily allocated to at least one communication unit, wherein a plurality of pending communication requests are pending, a method comprising the steps of:

at the communication unit;

identifying at least some pending communication requests in a list, wherein the at least some pending communication requests are one or more of the plurality of pending communication requests; and transmitting at least one instruction to order the at least some pending communication requests in a particular order comprising a user priority rank for at least one of the at least some pending communication requests;

at the communication system;

receiving the selected order; and when at least one communication resource is available for allocation, attempting to covert into an active communication a pending communication request from the plurality of pending communication requests on a priority basis, wherein the priority basis is determined from a system-devised priority and the selected order for the one or more pending communication requests.

5. The method of claim 4, further comprising the step of transmitting at least one instruction to delete at least one of the pending communication requests from the list.

6. The method of claim 5, further comprising the step of transmitting at least one instruction to undelete the at least one of the pending communication requests that was deleted, thereby returning the at least one of the pending communication requests to the list.

7. A method comprising the steps of:

receiving a call by a first communication unit in a communication system;

during the call, receiving, by the communication system, at least one request for communications with the first communication unit and placing the at least one request in a busy queue by an infrastructure of the communication system;

when the call is completed, transmitting, by the infrastructure, a list to the first communication unit, wherein the list is based on information in the busy queue;

receiving, by the first communication unit, the list;

displaying the list for a user for the first communication unit;

editing the list, producing an edited list, wherein the edited list comprises a user priority rank for at least one pending communication request in the list;

transmitting the edited list to the communication system;

at the communication system;

receiving the edited list;

when at least one communication resource is available for allocation, selecting a pending request from the edited list, wherein the pending request has a highest user priority rank from the edited list;

attempting to convert the pending request into an active communication.

8. The method of claim 7, wherein a data message is transmitted to the first communication unit, which generates an indication so as to provide notification that a pending communication request is present.

9. The method of claim 7, further comprising the step of requesting, by the first communication unit, the list from the infrastructure when the call is completed.

10. The method of claim 7, wherein the list comprises both individual calls and group calls, and wherein the step of editing further comprises editing the individual calls associated with the first communication unit.

11. The method of claim 7, further comprising the step of transmitting, by the first communication unit, the edited list to the infrastructure.

12. The method of claim 7, wherein the list comprises calls directed to the first communication unit, a second communication unit, or both the first communication unit and the second communication unit, and wherein the step of transmitting further comprises transmitting at least a part of the busy queue, wherein the part comprises calls directed to the first communication unit.

13. The method of claim 7, wherein the list comprises both individual calls and group calls, and wherein the step of editing further comprises prohibiting editing of the group calls.

14. The method of claim 7, wherein the step of editing comprises the step of selecting a priority for each of the at least one request for communications in the list.

15. The method of claim 14, wherein the infrastructure handles the at least one request for communications in the edited list in an order according to the selected priority.

16. The method of claim 7, wherein the step of editing comprises the step of deleting one of the at least one request for communications from the list.

17. The method of claim 7, wherein at least two requests for communications are in the list, and wherein the step of editing comprises the step of deleting two of the at least two requests for communications from the list.

18. The method of claim 16, further comprising the step of undeleting the deleted one of the at least one request for communications from the list, thereby returning the one of the at least one request for communications to the list.

19. The method of claim 7, further comprising the step of transmitting the list to the first communication unit when a subsequent request for communications with the first communication unit is placed in the busy queue.

20. A method comprising the steps of:

during a total system busy condition, receiving at least one request for communications with a first communication unit and placing the at least one request in a busy queue by an infrastructure of a communication system;

transmitting, by the infrastructure, a list to the first communication unit, wherein the list is based on information in the busy queue;

receiving, by the first communication unit, the list;

displaying the list for a user of the first communication unit;

editing the list, producing an edited list, wherein the edited list comprises a user priority rank for at least one pending communication request in the list;

transmitting the edited list to the communication system;

at the communication system;

receiving the edited list;

when at least one communication resource is available for allocation, selecting a pending request from the plurality of pending communication requests on a priority basis, wherein the priority basis is determined from a system-devised priority and the edited list for the one or more pending communication requests;

attempting to convert the pending request into an active communication.

21. The method of claim 20, wherein a data message is transmitted to the first communication unit, which generates an indication so as to provide notification that a pending communication request is present.

22. The method of claim 20, further comprising the step of transmitting, by the first communication unit, the edited list to the infrastructure.

23. The method of claim 20, wherein the list comprises calls directed to the first communication unit, a second communication unit, or both the first communication unit and the second communication unit, and wherein the step of transmitting further comprises transmitting at least a part of the busy queue, wherein the part comprises calls directed to the first communication unit.

24. The method of claim 20, further comprising the step of transmitting the list to the first communication unit when a subsequent request for communications with the first communication unit is placed in the busy queue.

25. A method of processing communication requests within a communication system, comprising the steps of:

determining when a first communication unit has completed a call or when a total system busy condition is no longer present;

determining if one or more requests for communication with the first communication unit are pending;

when one or more requests for communication with the first communication unit are pending, determining if at least one communication resource is available;

when at least one communication resource is available, obtaining a first pending request of the one or more requests for communication with the first communication unit;

determining whether an attempt to convert the first pending request into an active communication has occurred;

when the attempt to convert has not occurred, establishing whether the first pending request has a user priority rank;

determining, responsive to the establishing step, whether the user priority rank of the first pending request is a highest priority user priority rank; and when the user priority rank is the highest priority user priority rank, attempting to convert the first pending request into an active communication.

26. The method of claim 25, further comprising the step of when the first pending request is converted into an active communication, updating user priority rank for remaining pending requests.

27. The method of claim 25, further comprising the steps of:

when the user priority rank is not the highest priority user priority rank where the attempt to convert has not occurred, obtaining a second pending request of the one or more requests for communication with the first communication unit;

determining whether an attempt to convert the second pending request into an active communication has occurred;

when the attempt to convert has not occurred, determining whether the second pending request has a user priority rank;

when the second pending request has the user priority rank, determining whether the user priority rank of the second pending request is highest priority user priority rank where an attempt to convert has not occurred; and when the user priority rank is the highest priority user priority rank where the attempt to convert has not occurred, attempting to convert the second pending request into an active communication.

28. The method of claim 25, further comprising the steps of:

when the first pending request has the user priority rank, obtaining a second pending request of the one or more requests for communication with the first communication unit;

determining whether an attempt to convert the second pending request into an active communication has occurred;

when the attempt to convert has not occurred, determining whether the second pending request has a user priority rank;

when the second pending request has the user priority rank, determining whether the user priority rank of the second pending request is a highest priority user priority rank where an attempt to convert has not occurred; and when the user priority rank is the highest priority user priority rank where the attempt to convert has not occurred, attempting to convert the second pending request from a pending request into an active communication.

29. A method for a infrastructure of a communication system, wherein a plurality of pending communication requests are pending, comprising the steps of:

upon receipt of user selected priority information from a communication unit, obtaining at least one pending request record from a list of pending request records that the user selected priority information is associated with, wherein allocation of communication resources is necessary to satisfy the pending requests in the pending request records;

modifying the at least one pending request record with the user selected priority information;

transmitting an acknowledgment of the communication unit to indicate that the user priority information was processed;

when at least one communication resource is available for allocation, attempting to convert into an active communication a pending communication request from the plurality of pending communication requests on a priority basis, wherein the priority basis is determined from a system-devised priority and the user selected priority information.

30. The method of claim 29, wherein the user selected priority information comprises the communication unit ID, control information, and identification of the at least one pending request record.

31. The method of claim 29, wherein the control information comprises a user selected priority rank.

32. The method of claim 29, wherein the control information comprises an indication to delete the at least one pending record from the list of pending records.

33. The method of claim 32, wherein the control information comprises an indication to undelete at least one pending record that was deleted thereby returning the at least one pending record to the list of pending records.

* * * * *

UNITED STATES PATENT AND TRADEMARK OFFICE
CERTIFICATE OF CORRECTION

PATENT NO. : 5,537,684
DATED : July 16, 1996
INVENTOR(S) : Lizabeth Ann Cassidy, Daniel John McDonald It is certified that error appears in the above-indentified patent and that said Letters Patent is hereby corrected as shown below:

```
Column 11, line 31, "unit;" should be --unit:--,
Column 11, line 41, "system;" should be --system:--,
Column 12, line 1,  "unit;" should be --unit:--,
Column 12, line 10, "system;" should be --system:--,
Column 12, line 45, "system;" should be --system:--,
Column 13, line 49, "system;" should be --system:--.
```

Signed and Sealed this

Seventh Day of January, 1997

Attest:

BRUCE LEHMAN

*Attesting Officer*    *Commissioner of Patents and Trademarks*